(12) United States Patent
Stojkovic et al.

(10) Patent No.: US 7,390,056 B1
(45) Date of Patent: Jun. 24, 2008

(54) HYDROFORMED ATTACHMENT FACE FOR MODULAR COMPONENT

(75) Inventors: Dragan Stojkovic, Southgate, MI (US); Ken Garbinski, Saline, MI (US); Neal Lipman, West Bloomfield, MI (US); Ken Maltby, Milan, MI (US); Paul Luskin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 11/178,698

(22) Filed: Jul. 11, 2005

(51) Int. Cl.
*B62D 25/08* (2006.01)

(52) U.S. Cl. ............ 296/203.02; 296/205; 296/203.01; 296/193.09

(58) Field of Classification Search ............... 296/205, 296/203.02, 193.09; 266/203.01; 280/796, 280/797
See application file for complete search history.

(56) References Cited

U.S. PATENT DOCUMENTS

| | | | | |
|---|---|---|---|---|
| 2,955,870 | A * | 10/1960 | Richards | 296/193.09 |
| 4,327,809 | A | 5/1982 | Fenstermaker | 180/68.5 |
| 5,086,860 | A | 2/1992 | Francis | 180/68.5 |
| 5,259,660 | A * | 11/1993 | Haesters | 296/204 |
| 5,547,036 | A | 8/1996 | Gawaskar | 180/68.5 |
| 5,882,039 | A * | 3/1999 | Beckman et al. | 280/781 |
| 5,934,733 | A | 8/1999 | Manwaring | 296/72 |
| 6,068,330 | A * | 5/2000 | Kasuga et al. | 296/187.09 |
| 6,276,740 | B1 | 8/2001 | Mellor | 296/72 |
| 6,416,119 | B1 | 7/2002 | Gericke | 296/205 |
| 6,769,178 | B1 * | 8/2004 | Beckman | 29/897.2 |
| 7,001,097 | B2 * | 2/2006 | Wang et al. | 403/231 |
| 7,036,874 | B2 * | 5/2006 | Stojkovic et al. | 296/193.09 |
| 2002/0186999 | A1 * | 12/2002 | Ni et al. | 403/231 |
| 2005/0196228 | A1 * | 9/2005 | Bruggemann et al. | 403/231 |
| 2005/0274017 | A1 * | 12/2005 | Corcoran et al. | 29/897.2 |
| 2006/0096099 | A1 * | 5/2006 | Cripsey et al. | 29/897.2 |
| 2006/0290103 | A1 * | 12/2006 | Kottke et al. | 280/511 |

* cited by examiner

*Primary Examiner*—Dennis H. Pedder
*Assistant Examiner*—Mike Hernandez
(74) *Attorney, Agent, or Firm*—Gigette M. Bejin, Esq.; Miller Law Group, PLLC

(57) ABSTRACT

An automotive body structure member is formed through a hydroforming manufacturing process that incorporates an angularly oriented mounting face for the attachment of a pre-assembled modular component. The mounting face can be formed to recess into the surrounding structure of the structure member or to project outwardly therefrom. The mounting face is oriented obliquely to both the horizontal and vertical faces of the structure member to permit the insertion of fasteners into the mounting face at an angle that facilitates the mounting of the pre-assembled component. The assembly of the component to the structure member can be accomplished by a tool without interference with the component.

9 Claims, 3 Drawing Sheets

HYDROFORMED ATTACHMENT FACE FOR MODULAR COMPONENT

FIELD OF THE INVENTION

This invention relates to improving manufacturing processes for automobiles and, more particularly, to an attachment surface on a hydroformed support member for the mounting of a modular component thereto.

BACKGROUND OF THE INVENTION

Automobile frames are designed to support the many components attached thereto for forming the finished automotive vehicle. Some of the components attached to the frame are modular components, or pre-assembled devices that are intended to be mounted on the frame member by fasteners during the manufacturing process. Automobile frames, or body structures of an automobile, are being formed through a hydroforming process that can affect a shaping of a length of tubing material into a complex shape through the placement of the tubing material in a tooling die and subjecting the interior of the tubing material with substantial hydraulic pressure to re-shape the tubing material into the form defined by the tooling die.

To expedite the manufacturing process the modular or pre-assembled components to be mounted on the automotive frame are conventionally manufactured with openings therein to receive the fasteners to attach the component to a horizontal or vertical surface of the frame member. Such positioning of the fasteners can be disadvantageous when the pre-assembled component includes a subcomponent that is positioned in the pre-assembled component in an orientation that interferes with the utilization of a tool for inserting the fastener through the opening in the pre-assembled component and into the automotive frame member. One example of such a pre-assembled component would be a battery support case and tray that would have the battery included as part of the pre-assembled modular component to be installed. Conventionally, the openings in the battery support case are located in a vertical face of the support case, requiring the fasteners to be inserted horizontally through the support case into the frame member. If the battery is included in operative position within the battery support case and tray, access to the fastener holes is occluded, requiring the battery to be manually removed from the pre-assembled component before installation, thus increasing assembly time and manufacturing costs.

Conventional automotive framing members are formed from stamped and welded frame members with little room for variation in the manufacturing process. The utilization of the hydroforming process to form the automotive body structure members provides an opportunity to improve the manufacturing process and allow an enhanced use of pre-assembled components to incorporate more subcomponents into the assembly by improving the process and apparatus for mounting pre-assembled or modular components in the automotive manufacturing process.

A conventional mounting of the battery support case and tray and other modular components, such as a steering wheel bracket, in an automobile can be seen in U.S. Pat. No. 5,934,733, granted to David Manwaring on Aug. 10, 1999, and in U.S. Pat. No. 6,276,740, granted to Michael Mellor on Aug. 21, 2001, wherein a plurality of brackets are used to mount the support case and tray for the battery from an extruded beam forming part of an automotive frame. The vertical face of a vehicle frame member is used to support the battery support case in U.S. Pat. No. 5,086,860, issued to Laurie Francis, et al on Feb. 11, 1992, and in U.S. Pat. No. 4,327,809, issued to Michael Fenstermaker on May 4, 1982, in which the structure supporting the battery is formed with a flange or bracket that is connectable to the frame member. Similarly, the horizontal surface of an automotive frame member is used for attachment of a battery support case in U.S. Pat. No. 5,547,036, issued to Sudanand Gawaskar, et al on Aug. 20, 1996. In U.S. Pat. No. 6,416,119, granted to Dean Gericke, et al on Jul. 9, 2002, the pre-assembled components, such as the air cleaner and battery tray are attached to hydroformed rails by brackets.

Accordingly, it would be desirable to provide an improved hydroformed frame structure in which pre-assembled components, such as the battery support case, can be attached to the frame member with fasteners that are oriented in a non-perpendicular manner with respect to the pre-assembled component.

SUMMARY OF THE INVENTION

It is an object of this invention to overcome the aforementioned disadvantages of the known prior art by providing a hydroformed body structure member for an automobile that has an angularly oriented face formed into the structure of the structure member in order to mount a pre-assembled component with fasteners that are not oriented perpendicularly to the component.

It is a feature of this invention that the angularly oriented face on the automotive body structure member is formed during a hydroforming manufacturing process.

It is another feature of this invention that the fasteners connecting the pre-assembled component to the frame member or the body structure member are located in a manner to be accessed with a tool without interfering with the pre-assembled component.

It is an advantage of this invention that the pre-assembled component can be mounted to the automotive body structure member without requiring a temporary disassembly of the pre-assembled component.

It is another advantage of this invention that the fasteners mounting a battery support case are oriented that a tool for inserting the fasteners can be used without interference with the battery forming a part of the pre-assembled package.

It is another feature of this invention that the angularly oriented face on the automotive body structure member can be recessed into the structure of the frame member.

It is yet another feature of this invention that the angularly oriented face on the automotive body structure can project outwardly from the adjacent structure of the frame member.

It is still another advantage of this invention that accessibility of the mounting hardware for a pre-assembled modular component in an automobile is improved.

It is still another feature of this invention that the shape required to provide an angularly oriented face for the mounting of pre-assembled modular components to an automotive body structure can be created with a hydroforming manufacturing process.

It is a further object of this invention to provide an angled attachment face in an automotive body structure member for the mounting of a pre-assembled modular component that is durable in construction, inexpensive of manufacture, carefree of maintenance, facile in assemblage, and simple and effective in use.

These and other objects, features and advantages are accomplished according to the instant invention by providing an automotive body structure member formed through a hydroforming manufacturing process that incorporates an angularly oriented mounting face for the attachment of a pre-assembled modular component. The mounting face can be formed to recess into the surrounding structure of the structure member or to project outwardly therefrom. The mounting face is oriented obliquely to both the horizontal and vertical faces of the structure member to permit the insertion of fasteners into the mounting face at an angle that facilitates the mounting of the pre-assembled component. The assembly of the component to the structure member can be accomplished by a tool without interference with the component.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
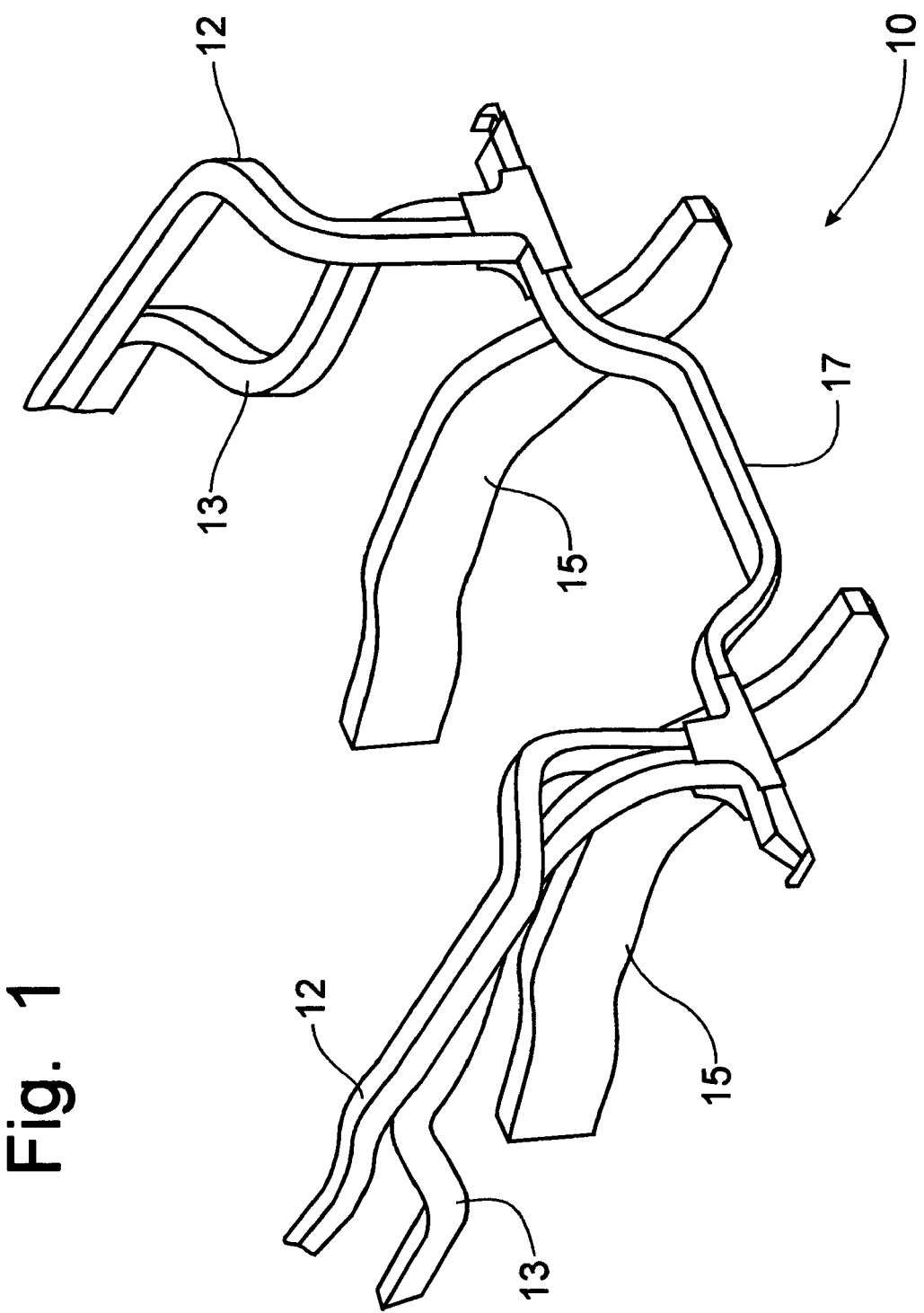
FIG. 1 is a right, front perspective view of an automotive front structure having frame members formed through a hydroformed manufacturing process.

Referring to the drawings, a hydroformed automotive body structure, which serves as the frame of the automobile, incorporating the principles of the instant invention can best be seen. The principles of the instant invention are depicted in conjunction with the mounting of a pre-assembled air cleaner, including the support case, installed as part of the pre-assembled assembly for mounting on the automotive body structure during the assembly process as a modular component. However, one of ordinary skill in the art will recognize that the principles of the instant invention will be applicable to many different pre-assembled or modular components for mounting on the automotive body structure in a manner that expedites the assembly process and reduces manufacturing cost.

The automotive body structure, or frame, 10 can be formed in a variety of configurations, but most include an upper frame rail 12, a lower frame rail 15 which support a transverse bumper 17. The body structure assembly 10 depicted in FIG. 1 is of the front end of an automobile and the majority of the individual front structure components, including the upper rail 12, lower rail 15 and shock tower support member 13 are formed through a hydroforming manufacturing process.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. Through die cutouts, access openings can be formed into the re-shaped tubular member to permit spot-welding electrodes to gain access to opposing adjacent sides so as to create a weld bond between juxtaposed members. In this manner, the automotive body structure 10 can be created using in large part hydroformed tubular members.

The body structure 10 supports a substantial number of assemblies, most of which are pre-assembled in a modular form and introduced into the assembly line as a component to be mounted to the structure 10. One such pre-assembled component is the air cleaner assembly 20, which includes a support case 22 that is preferably pre-assembled with the air cleaner already mounted in the support case 22 ready for attachment to the upper frame rail 12 near the front of the frame 10. Other pre-assembled components can include the air bag assembly, the battery assembly, the windshield washer container, electronic components, etc.

As is represented in FIGS. 2-5, the hydroformed body structure member, depicted as the upper frame rail 12, is formed with an angled face 25 that preferably faces upwardly at an angle that is non-perpendicular to either of the normal horizontal face 27 of the frame member 12 or the normal vertical face 28 of the frame member 12. A hole 26 formed in the angled face 25 during the hydroforming process permits the receipt of a fastener 23 connecting the component 20 to the frame member 12. The support case 22 is preferably formed with a mating attachment flange 24 that is oriented in a manner corresponding to the angled face 25 of the frame member 12. In addition to the air cleaner assembly 20, the upper frame rail 12 has mounted thereto a number of other components, such as the fender 19 that attaches to the upper horizontal surface 27 of the upper frame rail 12.

Figure 2:
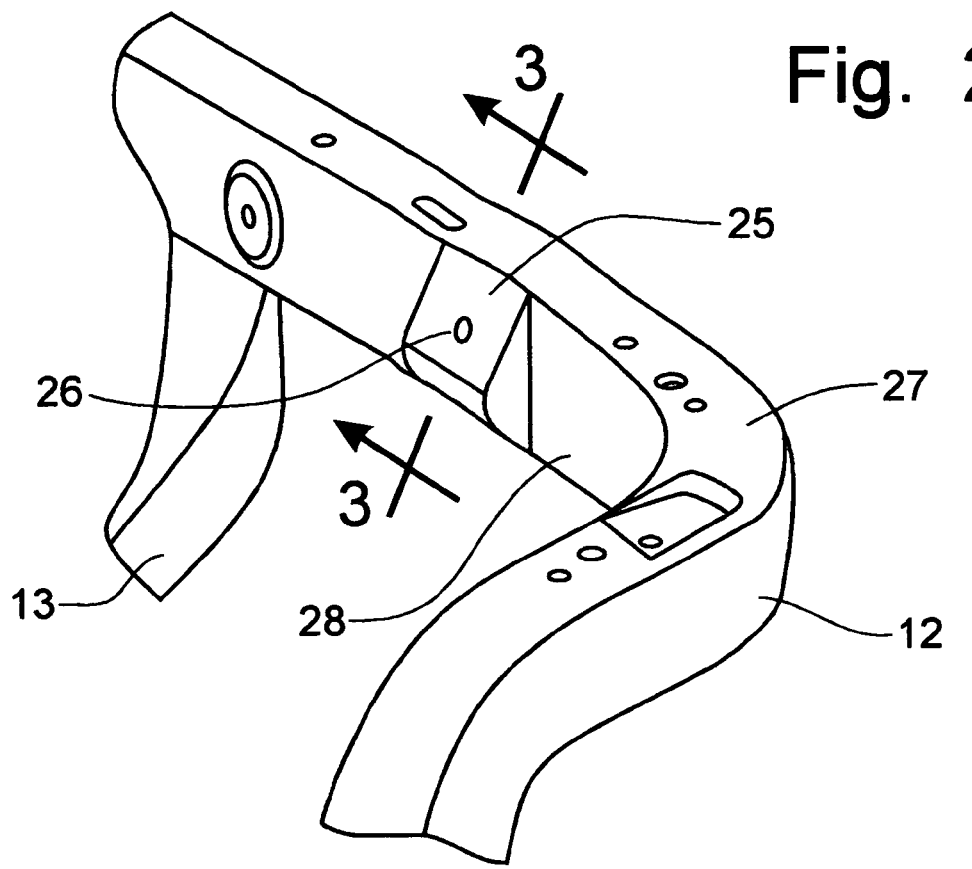
FIG. 2 is an enlarged right, front perspective view of a portion of a hydroformed structure member incorporating the principles of the instant invention.
Figure 3:
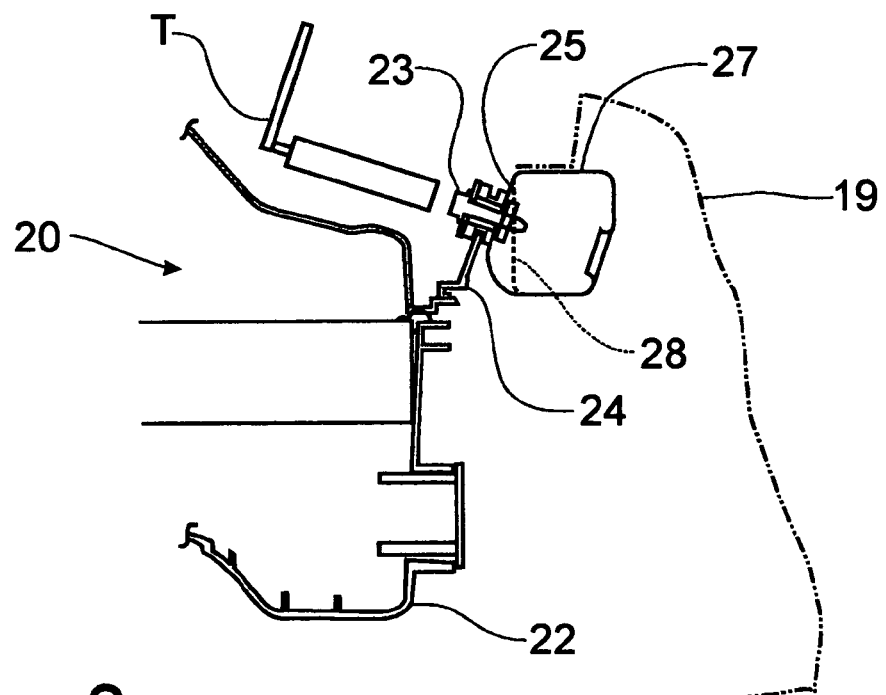
FIG. 3 is a cross-sectional view of the structure member through the mounting face corresponding to lines 3-3 of FIG. 2, a schematic representation of a fender mounted to the structure member being shown in phantom and a pre-assembled component being attached by fasteners to the mounting face of the structure member.
Figure 4:
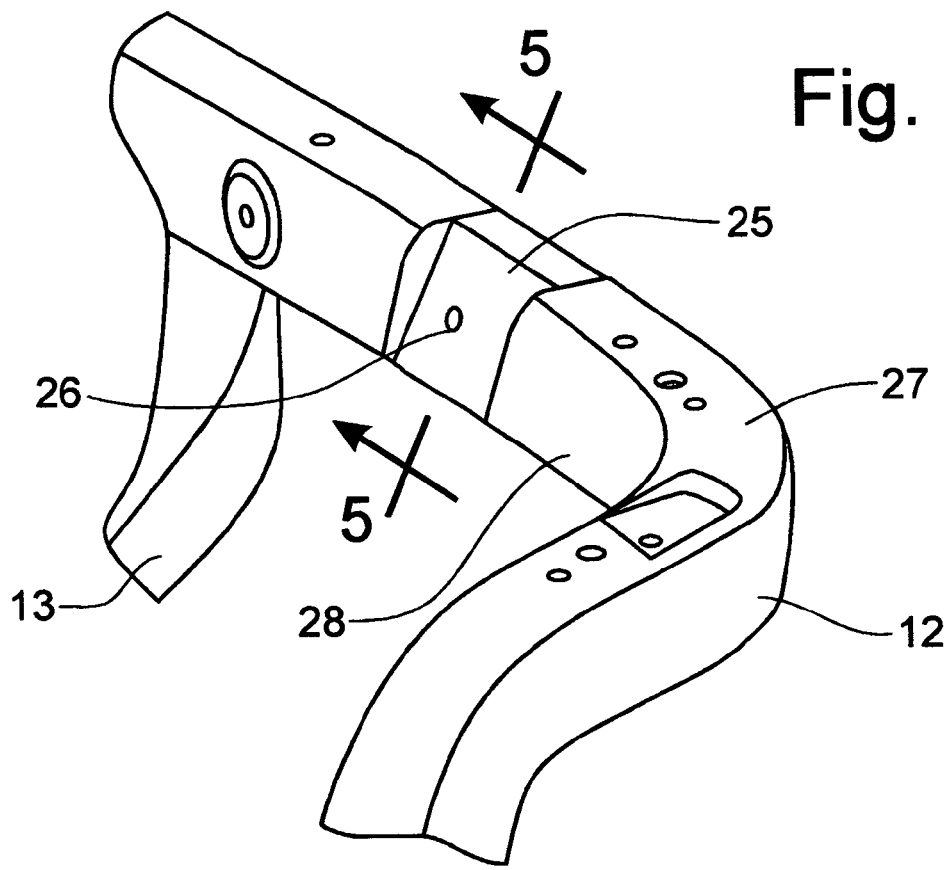
FIG. 4 is an enlarged right, front perspective view of an alternative embodiment of the hydroformed structure member incorporating the principles of the instant invention.

In the embodiment depicted in FIGS. 2 and 3, the angled face is formed to project outwardly from the vertical face 28 of the front structure member 12, thus maintaining a generally uniform width in the horizontal upper surface 27. In the embodiment depicted in FIGS. 4 and 5, the angled face 25 is recessed into the vertical face 28 to somewhat reduce the width of the horizontal upper face 27 of the upper frame rail 12. The selection of which embodiment to utilize depends on other extraneous factors such as the forces exerted on the frame member, spatial parameters of the pre-assembled components, orientation of other components for access to the fasteners 23 by a tool for inserting and tightening the fasteners into the hole 26.

Figure 5:
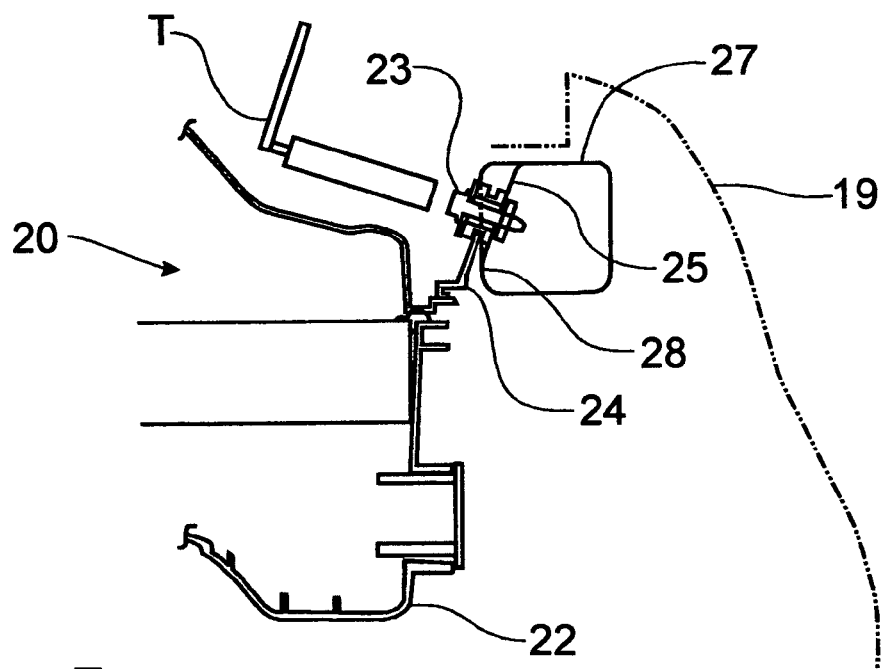
FIG. 5 is a cross-sectional view of the structure member taken through the angled mounting face corresponding to lines 4-4 of FIG. 3, a schematic representation of a fender mounted to the structure member being shown in phantom and a pre-assembled component being attached by fasteners to the mounting face of the structure member.

In use, the angled face 25 permits the insertion of the fasteners 23 attaching the pre-assembled component 20 to the structure member 12 at an angle to the structure member 12 and the component 20 that is neither horizontal nor vertical, and is not perpendicular to the component. As can be seen in FIGS. 3 and 5, the fastener can be accessed by a tool T without interference with the component 20 or requiring a temporary disassembly of the component 20 to permit the fasteners to be inserted. As a result, the pre-assembled component 20 can be formed outside of the assembly line and delivered thereto with more components included into the pre-assembled component 20, which can be quickly and easily attached to the structure member 12 with fasteners 23 engaged within the holes 26 in the angled face 25, to speed-up assembly time and, thereby, reduce manufacturing costs.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A hydroformed structure member for use in an automotive body structure assembly comprising:
    a generally horizontal surface;
    a generally vertical surface integral with said generally horizontal surface; and an angled mounting face extending downwardly from said generally horizontal surface to said generally vertical surface and defining an upwardly angled surface disposed obliquely at an angle to said generally vertical surface of less than 45 degrees, said angled mounting face having at least one opening therein for the receipt of a fastener mounting a component to said structure member, said angled mounting face being recessed into said generally vertical surface, thereby reducing the width of said generally horizontal surface adjacent said mounting face.

2. The structure member of claim 1 wherein said structure member is an upper frame rail, said component being a pre-assembled component assembly.

3. The structure member of claim 2 wherein said component is formed with an attachment flange angled to mate with said mounting face, said fastener connecting said attachment flange to said mounting face.

4. In an automotive vehicle having a body structure including an upper frame rail and a pre-assembled component mounted on said upper frame rail, the improvement comprising:
    said upper frame rail being formed with an angled mounting face extending downwardly from a generally horizontal surface to a generally vertical surface and defining an upwardly angled surface oriented obliquely at an angle to said generally vertical surface of less than 45 degrees and to said generally horizontal surface of said upper frame rail, said mounting face being formed with at least one hole therein for receipt of a fastener, said angled mounting face being recessed into said generally vertical surface, thereby reducing the width of a generally horizontal surface adjacent said mounting face; and
    said pre-assembled component being formed with an attachment flange oriented at an angle corresponding to said angled mounting face, said fastener interengaging said attachment flange and said angled mounting face to affect a mounting of said pre-assembled component to said upper frame rail.

5. The automotive vehicle of claim 4 wherein said angled mounting face is formed in said upper frame rail during a hydroforming manufacturing process.

6. The automotive vehicle of claim 5 wherein said angled mounting face projects outwardly from said generally vertical surface.

7. The automotive vehicle of claim 5 wherein said pre-assembled component is an air cleaner assembly.

8. The automotive vehicle of claim 5 wherein said fasteners attaching said pre-assembled component to said angled mounting face are angled upwardly from said pre-assembled component to permit access to a tool for manipulating said fasteners without interfering with said pre-assembled component.

9. An assembly of an automotive component mounted to an automotive structure member formed through a hydroforming manufacturing process and having a generally horizontal surface and a generally vertical surface, comprising:
    an angled mounting face formed in said structure member at an upwardly facing oblique angle recessed inwardly into said generally vertical surface to reduce a generally horizontal surface of said structure member adjacent said angled mounting face, said angled mounting face being formed with an opening therein for the receipt of a fastener; and
    said component being formed with an angled attachment flanged disposed at said oblique angle to mate with said angled mounting face, said fastener connecting said attachment flange to said angled mounting face by passing through said attachment flange to be received through said opening in said mounting face.

* * * * *